United States Patent [19]

Rathjen et al.

[11] 4,140,066
[45] Feb. 20, 1979

[54] THERMAL DECOMPOSITION OF POLYCHLORINATED ORGANIC COMPOUNDS

[75] Inventors: Heinrich Rathjen, Leverkusen; Werner Hüning, Odenthal; Hans J. Himmen; Karl Wrabetz, both of Leverkusen; Götz-Gerald Börger, Monheim; Rolf Germerdonk, Bergisch-Gladbach; Claus Gockel, Odenthal, all of Fed. Rep. of Germany

[73] Assignee: Bayer Aktiengesellschaft, Leverkusen, Fed. Rep. of Germany

[21] Appl. No.: 782,474

[22] Filed: Mar. 28, 1977

[30] Foreign Application Priority Data

Apr. 2, 1976 [DE] Fed. Rep. of Germany ....... 2614384

[51] Int. Cl.$^2$ .......................... F23G 7/00; F23G 7/04
[52] U.S. Cl. ..................................... 110/235; 423/481
[58] Field of Search ........................ 110/7 R, 7 B, 7 S; 423/481, 488

[56] References Cited

U.S. PATENT DOCUMENTS

| | | | |
|---|---|---|---|
| 3,140,155 | 7/1964 | Coll et al. | 423/481 |
| 3,716,339 | 2/1973 | Shigaki et al. | 423/488 |
| 3,829,558 | 8/1974 | Banks et al. | 423/488 |
| 3,885,906 | 5/1975 | Shunygin et al. | 110/2 B |
| 3,941,066 | 3/1976 | Itoh et al. | 110/18 R |
| 3,980,758 | 9/1976 | Krumböck et al. | 428/488 |

Primary Examiner—Louis J. Casaregola
Attorney, Agent, or Firm—Sprung, Felfe, Horn, Lynch & Kramer

[57] ABSTRACT

A process for the thermal decomposition of polychorinated organic compounds such as polychlorinated phenyls and biphenyls comprising heat treating the polychlorinated organic compounds in a flame, in a high-turbulence combustion chamber in a pulsating spiral flow at a temperature of at least about 850° C. with a residence time of at least about 0.1 second, an excess of at least about 5% by weight of oxygen, based on the organic carbon to be burnt, being present in the combustion chamber. Advantageously the polychlorinated organic compound is present in the fuel feed in about 0.1 to 30% by weight.

2 Claims, No Drawings

THERMAL DECOMPOSITION OF POLYCHLORINATED ORGANIC COMPOUNDS

It is known that polychlorinated organic compounds, for example polychlorinated phenyls or biphenyls, are thermally stable to a very large degree. For this reason, the technical manual "Luft" ('Gemeinsames Ministerialblatt', No. 24, 1974, page 442) quotes a minimum temperature of 1200° C. for the decomposition of polychlorinated compounds of this kind, the residence time having to be greater than 0.3 second unless the heat treatment is carried out in a fluidized bed. It is relatively expensive to carry out the heat treatment in a fluidized bed. Furthermore residence times of greater than 0.3 second and temperatures of 1200° C. make decomposition of the above-mentioned polychlorinated compounds very difficult and expensive. Accordingly, an object of the present invention is to enable these compounds to be substantially quantitatively decomposed, even at relatively low temperatures and with relatively short residence times.

It has now surprisingly been found that polychlorinated phenyls and/or biphenyls can be substantially quantitatively decomposed at temperatures of as low as about 850° C. and with residence times of as short as 0.1 second in a combustion chamber which operates with extremely intense turbulence and pulsation preferably generated by high-frequency vortex breakoff. Combustion chambers of this kind are known as combustors and, in particular, as pulsocombustors and are described, for example, in "Wasser, Luft und Betrieb" 18 (1974), No. 9, pages 494 to 497.

Accordingly, the present invention relates to a process for the thermal decomposition of polychorinated organic compounds such as, for example, polychlorinated phenyls and biphenyls in a flame, which is distinguished by the fact that the polychorinated organic compounds or fuel containing these compounds are heated in a high-turbulence combustion chamber in a pulsating spiral flow at temperatures of at least 850° C. and over residence times of up to 0.1 second, an excess of at least 5% by weight of oxygen, based on the organic carbon to be burnt, being present in the combustion chamber.

In the process according to the invention, it is immaterial whether the chlorinated hydrocarbons are added to the combustion air or to the liquid fuel. In general, a chlorinated hydrocarbon content of about $10^{-4}$ to 1% by weight, based on the combustion air, is present in the combustion air. Air extracted from the factory or from the emission sources is used as the combustion air, while oil for example is used as the fuel, waste oil being particularly preferred. In cases where the chlorinated hydrocarbons are added to a liquid fuel, they are added in quantities of about 0.1 to 30% by weight, based on the fuel.

By virtue of the process according to the invention, it is possible to decompose the polychorinated compounds to a level of ≤ 1 ppb in the smoke gas.

EXAMPLE 1000 m$^3$ per h of exhaust air with 0.1 g per m$^3$ polychlorinated biphenyls and 2 g per m$^3$ dichlorobenzene of 50° C. are introduced, together with 57.8 kg per h of liquid waste containing, at a lowest calorific value of 5100 kcal per kg, 5 weight-% of polychlorinated biphenyls and 15 weight-% of polychlorinated phenyls, into a combustor with an subsequent smoke gas wash; in the combustor all the organic compounds are thermally decomposed at the self-regulating combustion chamber temperature of 850° C. The cylindrical combustion chamber has the following measurements: diameter 475 mm, length 700 mm, central inlet nozzle for the exhaust air used simultaneously as combustion air: 200 mm diameter. The twist of the exhaust air in the inlet nozzle is determined by the maximum ratio of 2.5 = peripheral velocity to axial velocity, calculated from the pressure losses in the twist counter. The actual peripheral velocities could not be measured, since, owing to the intensive combustion already present in this cross-section, cooled probes should be used, which were not available. The fuel is fed in centrally via a two component nozzle with ~30 kg per h of saturated steam of 5 bars. Under these operating conditions all the polychlorinated biphenyls employed were decomposed at the outlet of the combustion chamber, preceeding the smoke gas wash, to lower than the identification limit of 2 ppb. The remaining amount of organic compounds in the smoke gas was <30 mg $C_{org}$ per m$^3$, measured with a HCl-resistant flame ionisation detector; and the hydrogen chloride content was ~7 g per m$^3$. This level is so low that the smoke gas can be safely vented to the atmosphere.

It will be appreciated that the instant specification and examples are set forth by way of illustration and not limitation, and that various modifications and changes may be made without departing from the spirit and scope of the present invention.

What is claimed is:

1. A process for the thermal decomposition of polychlorinated biphenyls comprising heat treating the polychlorinated biphenyls in a flame in a high-turbulence combustion chamber in a pulsating spiral flow at a temperature of about 850° C. with a residence time of about 0.1 second, an excess of at least about 5% by weight of oxygen, based on the organic carbon to be burnt, being present in the combustion chamber.

2. A process as claimed in claim 1, wherein a fuel is supplied to the combustion chamber and the polychlorinated biphenyls are present in the fuel in about 0.1 to 30% by weight.

* * * * *